United States Patent
Porosoff et al.

(10) Patent No.: US 11,890,598 B2
(45) Date of Patent: Feb. 6, 2024

(54) ALKALI METAL DOPED MOLYBDENUM CARBIDE SUPPORTED ON GAMMA-ALUMINA FOR SELECTIVE $CO_2$ HYDROGENATION INTO CO

(71) Applicant: The Government of the United States of America, as represented by the Secretary of the Navy, Arlington, VA (US)

(72) Inventors: Marc Porosoff, Washington, DC (US); Heather D. Willauer, Fairfax Station, VA (US)

(73) Assignee: The Government of the United States of America, as represented by the Secretary of the Navy, Arlington, VA (US)

( * ) Notice: Subject to any disclaimer, the term of this patent is extended or adjusted under 35 U.S.C. 154(b) by 36 days.

(21) Appl. No.: 17/688,645

(22) Filed: Mar. 7, 2022

(65) Prior Publication Data

US 2022/0184587 A1 Jun. 16, 2022

Related U.S. Application Data

(62) Division of application No. 16/508,474, filed on Jul. 11, 2019, now Pat. No. 11,266,980.

(51) Int. Cl.
*B01J 27/22* (2006.01)
*C01B 32/40* (2017.01)
*C01B 32/949* (2017.01)
*B01J 37/02* (2006.01)
*B01J 21/02* (2006.01)
*B01J 37/08* (2006.01)
*B01J 21/04* (2006.01)

(52) U.S. Cl.
CPC ............... *B01J 27/22* (2013.01); *B01J 21/02* (2013.01); *B01J 37/0201* (2013.01); *B01J 37/08* (2013.01); *C01B 32/40* (2017.08); *C01B 32/949* (2017.08); *B01J 21/04* (2013.01); *B01J 37/084* (2013.01)

(58) Field of Classification Search
None
See application file for complete search history.

(56) References Cited

PUBLICATIONS

Vo et al, "A potassium-promoted Mo carbide catalyst system for hydrocarbon synthesis," Catal. Sci. Technol., 2012, 2, 2066-2076 (Year: 2012).*

* cited by examiner

*Primary Examiner* — Colin W. Slifka
(74) *Attorney, Agent, or Firm* — US Naval Research Laboratory; Rebecca L. Forman

(57) ABSTRACT

A supported heterogeneous catalyst material for catalyzing the reverse water-gas shift (RWGS) reaction for the selective formation of CO using an alkali metal-doped molybdenum carbide on a gamma alumina support (A-$Mo_2C$/$\gamma$-$Al_2O_3$, A=K, Na, Li). The A-$Mo_2C$/$\gamma$-$Al_2O_3$ catalyst is synthesized by co-impregnation of molybdemun and alkali metal precursors onto a $\gamma$-$Al_2O_3$ support. It is then carburized to form the A-$Mo_2C$/$\gamma$-$Al_2O_3$.

2 Claims, 4 Drawing Sheets

ALKALI METAL DOPED MOLYBDENUM CARBIDE SUPPORTED ON GAMMA-ALUMINA FOR SELECTIVE $CO_2$ HYDROGENATION INTO CO

PRIORITY CLAIM

The present application is a divisional application of U.S. application Ser. No. 16/508,474, filed on Jul. 11, 2019 by Marc Porosoff et al., entitled "ALKALI METAL DOPED MOLYBDENUM CARBIDE SUPPORTED ON GAMMA-ALUMINA FOR SELECTIVE $CO_2$ HYDROGENATION INTO CO", which was a divisional application of U.S. application Ser. No. 15/616,024, filed on Jun. 7, 2017 by Marc Porosoff et al., entitled "ALKALI METAL DOPED MOLYBDENUM CARBIDE SUPPORTED ON GAMMA-ALUMINA FOR SELECTIVE $CO_2$ HYDROGENATION INTO CO", which claimed the benefit of U.S. Provisional Application No. 62/362,716, filed on Jul. 15, 2016 by Marc Porosoff et al., entitled "POTASSIUM DOPED MOLYBDENUM CARBIDE SUPPORTED ON GAMMA-ALUMINA FOR SELECTIVE $CO_2$ HYDROGENATION INTO CO" and U.S. Provisional Application No. 62/394,341, filed on Sep. 14, 2016 by Marc Porosoff et al., entitled "POTASSIUM DOPED MOLYBDENUM CARBIDE SUPPORTED ON GAMMA-ALUMINA FOR SELECTIVE CO2 HYDROGENATION INTO CO." All of these applications and all other publications and patent documents referred to throughout this application are incorporated herein by reference in their entirety.

BACKGROUND OF THE INVENTION

Field of the Invention

The present invention relates to $CO_2$ hydrogenation reactions to selectively produce CO via the reverse water-gas shift (RWGS) reaction for down-stream hydrocarbon synthesis.

Description of the Prior Art

The high concentration of $CO_2$ in seawater, ca. 100 mg $L^{-1}$, represents a significant opportunity to extract and use this $CO_2$ as a $C_1$ feedstock for synthetic fuels. Through an existing process patented by the U.S. Navy (U.S. Pat. No. 9,303,323), $CO_2$ and $H_2$ can be concurrently extracted from seawater and used as reactants for direct Fischer-Tropsch from $CO_2$ ($CO_2$-FT) to produce valuable oxygenates, specialty chemicals and intermediate hydrocarbons ($C_2$-$C_6$) for synthetic fuel. (Wang et al., Chem. Soc. Rev. 40, 3703-3727 (2011) and Centi et al., Today, 148, 191-205 (2009)). If the energy input is nuclear or renewable, the entire process can be considered $CO_2$-neutral. (Willauer et al., J. Renew. and Sustain. Energ., 4, 033111 (2012)).

The most commonly used catalysts for $CO_2$-FT are slight variations of Fe and Co-based Fischer-Tropsch (FT) catalysts, which show promise, but are not specifically designed for the $CO_2$ reactant. (Kaiser et al., Chem-Ing-Tech, 85, 489-499 (2013), Chakrabarti et al., Ind. Eng. Chem. Res., 54, 1189-1196 (2015), and Dorner et al., Energ. Environ. Sci., 3, 884-890 (2010)). The current optimal catalyst, K—Mn—Fe/$Al_2O_3$, achieves a $CO_2$ conversion of 41.4% and a selectivity towards $C_2$-$C_5$+ hydrocarbons of 62.4% at a gas hourly space velocity (GHSV) of 0.0015 L $g^{-1}$ $s^{-1}$, but the mechanism is poorly understood, making catalyst improvements challenging. (Dorner et al., Appl. Catal. A-Gen., 373, 112-121 (2010)). There is some consensus that an Fe carbide formed during the reaction is the catalytically active phase (Lee et al., J. Mol. Catal. A-Chem., 301, 98-105 (2009)); however, reports also state that Fe catalysts are poisoned by water, an unavoidable byproduct, negatively influencing catalytic activity and product selectivity. (Riedel et al., Appl. Catal. A-Gen., 186, 201-213 (1999) and Willauer et al., J. CO2 Util., 3-4, 56-64 (2013)). Conversely, Co-based catalysts are water tolerant (Schulz et al., in Studies in Surface Science and Catalysis, Vol. 107 (Eds.: dePontes et al.), Elsevier, pp. 193-200 (1997)) and modifying an Fe catalyst with Co improves catalytic performance and selectivity towards $C_2$+ hydrocarbon products. (Sathawong et al., Catal. Today, 251, 34-40 (2015) and Sathawong et al., Top. Catal., 57, 588-594 (2014)). Improvements have also been made to Fe-based catalysts by adding Cu, which enhances $CO_2$-FT activity and selectivity. (Sathawong et al., Top. Catal., 57, 588-594 (2014)).

Although there are promising catalysts for $CO_2$-FT, the structure-property relationships that control activity and selectivity to intermediate hydrocarbons are not well studied. (Porosoff et al., Energ. Environ. Sci., 9, 62-73 (2016)). Furthermore, because of the complexity of $CO_2$-FT, the alternative route of feeding CO produced from reverse water-gas shift (RWGS) into a FT reactor must also be considered. For industrial RWGS, operating temperatures are very high, typically at or above 600° C. at 2.8 MPa, over ZnO/$Al_2O_3$ and ZnO/$Cr_2O_3$ catalysts. Because methane ($CH_4$) is thermodynamically favored below 600° C., these catalysts require high temperatures to selectively produce CO, which also results in substantial deactivation. (Joo et al., Ind. Eng. Chem. Res., 38, 1808-1812 (1999) and Park et al., Journal of Chemical Engineering, 17, 719-722 (2000)). To make fuel synthesis from $CO_2$ viable, a low-cost and stable RWGS catalyst is first required, which can achieve high selectivity to CO over a wide range of conversion and operating temperatures.

Recently, Pt-based catalysts have been investigated for RWGS (Kattel et al., Angew. Chem. Int. Edit., 128, 8100-8105 (2016) and Porosoff et al., J. Catal., 301, 30-37 (2013)), but they are expensive, and thus, unviable for an industrial scale $CO_2$ conversion process. As an alternative, transition metal carbides (TMCs) are low-cost, with similar electronic properties to precious metals. (Levy et al., Science, 181, 547-549 (1973) and Porosoff et al., Chem. Comm., 51, 6988-6991 (2015)). Density functional theory (DFT) calculations over the TMC, molybdenum carbide ($Mo_2C$) demonstrate that Mo-terminated $Mo_2C$ has many properties similar to transition metals including Ru, Fe, Co and Ni catalysts, all of which are active for $CO_2$ conversion. (Medford et al., J. Catal., 290, 108-117 (2012)). DFT calculations by Shi et al. further illustrate that $CO_2$ dissociation ($CO_2 \rightarrow CO+O$) is more favorable than $CO_2$ hydrogenation ($CO_2+H \rightarrow HCOO$ or COOH) over $Mo_2C$, suggesting high CO selectivity. (Shi et al., Appl. Catal. A-Gen., 524, 223-236 (2016)). Reactor experiments over unsupported-$Mo_2C$ powder catalysts for RWGS at 300° C. and 0.11 MPa show 8.7% conversion and 93.9% selectivity towards CO (Porosoff et al., Angew. Chem. Int. Edit., 53, 6705-6709 (2014)), confirming the DFT calculations. Another study over $Mo_2C$ nanowires also reports high activity and CO selectivity at 600° C. (Gao et al., Catal. Comm., 84, 147-150 (2016)). The high intrinsic activity of $Mo_2C$ originates from $CO_2$ binding in a bent configuration, leading to spontaneous breakage of a C=O bond, leaving CO and O bound to the surface. (Posada-Perez et al., Phys. Chem. Chem. Phys., 16, 14912-14921 (2014)). The CO can desorb from the surface, while the oxy-carbide (O—Mo$_2$C) is restored to the active carbide through hydrogenation. (Porosoff et al., Angew. Chem. Int. Edit., 53, 6705-6709 (2014)).

Mo$_2$C can also be modified with metal nanoparticles (Cu, Co, Ni), which influence the product selectivity, leading to MeOH with Cu (Posada-Perez et al., Catal. Sci. Technol., 6, 6766-6777 (2016)), C$_2$+ hydrocarbons with Co and CH$_4$ with Ni. (Griboval-Constant et al., Appl. Catal. A-Gen., 260, 35-45 (2004) and Xu et al., Catal. Lett., 145, 1365-1373 (2015)). Because modifying Mo$_2$C with a metal promoter can further tune the selectivity between MeOH, C$_2$+ hydrocarbons or CH$_4$, it may be possible to modify Mo$_2$C to selectively produce even more CO across a wide range of conversions and temperatures. Experimental and theoretical studies suggest that potassium (K) promoters increase the binding energy, and therefore, reactivity of CO$_2$, thereby promoting C=O bond scission and formation of CO. (Solymosi et al., Catal. Lett., 66, 227-230 (2000) and Pistonesi et al., Catal. Today, 181, 102-107 (2012)).

Molybdenum carbide has been employed as a catalyst for CO$_2$ hydrogenation as a pure material, supported on γ-Al$_2$O$_3$ and when modified with various metals (Co, Ni, Fe). It has been used as an alternative to precious metals for many catalytic reactions, and more recently has been applied to CO$_2$ hydrogenation. CO$_2$ hydrogenation over these previous catalysts is comparable to the current invention; however, the selectivity and yield to CO is significantly lower.

BRIEF SUMMARY OF THE INVENTION

The present invention provides a class of catalysts for CO$_2$ hydrogenation via the RWGS reaction to selectively produce CO for down-stream hydrocarbon synthesis. Alkali metal-doped molybdenum carbide, supported on gamma alumina (A-Mo$_2$C/γ-Al$_2$O$_3$, A=K, Na, Li), is synthesized by co-impregnation of (NH$_4$)6Mo$_7$O$_{24}$.4H$_2$O and A-NO$_3$ precursors (A=K, Na, Li) onto a γ-Al$_2$O$_3$ support. The A-Mo/γ-Al$_2$O$_3$ catalyst is then carburized to form the A-Mo$_2$C/γ-Al$_2$O$_3$.

Alkali metal-promoted molybdenum carbide supported on gamma alumina is a low-cost, stable and highly selective catalyst for RWGS over a wide range of conversion. These findings are supported by X-ray diffraction (XRD), scanning electron microscopy (SEM) with energy dispersive X-ray spectroscopy (EDS), X-ray photoelectron spectroscopy (XPS) and density functional theory (DFT) calculations.

These and other features and advantages of the invention, as well as the invention itself, will become better understood by reference to the following detailed description, appended claims, and accompanying drawings.

DETAILED DESCRIPTION OF THE INVENTION

The present invention provides for a supported heterogeneous catalyst material for catalyzing the RWGS reaction for the selective formation of CO. The catalyst has a support material of γ-Al$_2$O$_3$ and an active material of alkali-metal doped molybdenum carbide. The alkali-metal component of the active material may comprise one or more alkali-metal precursors in elemental form or in the form of oxides, with the metals being K, Na, Li, or any combination thereof. The molybdenum component of the active material may comprise one or more molybdenum precursors in the form of carbides, oxycarbides, oxides, elemental molybdenum, or any combination thereof.

Figure 1:
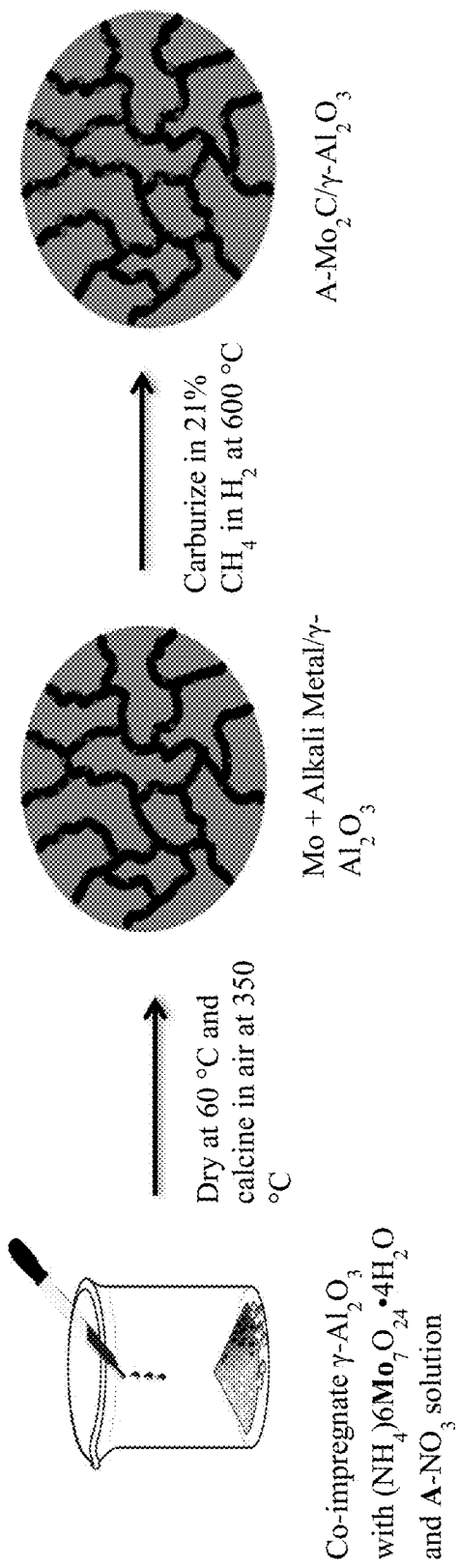
FIG. 1 shows the synthesis procedure for alkali metal doped molybdenum carbide supported on gamma alumina.

FIG. 1 shows the synthesis procedure for alkali metal doped molybdenum carbide supported on gamma alumina. Alkali metal-doped molybdenum carbide, supported on gamma alumina (A-Mo$_2$C/γ-Al$_2$O$_3$, A=K, Na, Li) was synthesized by co-impregnation of (NH$_4$)6Mo$_7$O$_{24}$.4H$_2$O and A-NO$_3$ precursors (A=K, Na, Li) onto a γ-Al$_2$O$_3$ support by the evaporation deposition method. In brief, the precursors were dissolved in deionized water at the concentrations required to obtain molar ratios of 1/4/15 A/Mo/γ-Al$_2$O$_3$, which translates to 2% potassium (K), 1.2% sodium (Na), 0.4% lithium (Li) and 20.8% Mo loading on the γ-Al$_2$O$_3$ support. Aqueous solutions of the metal precursors were added to a beaker of γ-Al$_2$O$_3$ and dried overnight under stirring at 60° C., then calcined in air overnight at 350° C.

Figure 2A:
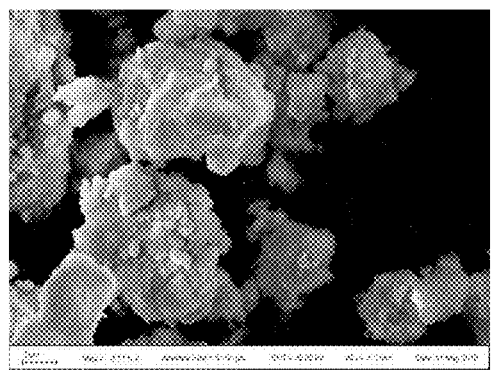
FIG. 2A is a low magnification scanning electron microscopy (SEM) image of K—Mo$_2$C/γ-Al$_2$O$_3$.
Figure 2B:
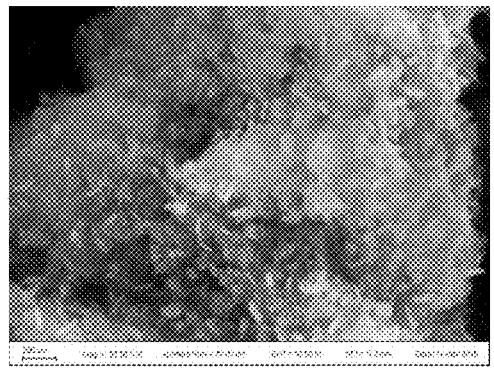
FIG. 2B is a high magnification SEM image of K—Mo$_2$C/γ-Al$_2$O$_3$.

The A-Mo/γ-Al$_2$O$_3$ catalyst was then carburized in a 21% CH$_4$ in H$_2$ mixture at 600° C. for 2.5 hours to form the A-Mo$_2$C/γ-Al$_2$O$_3$. After the first 1.5 hour, the CH$_4$ was shut off and the carbide was cooled to room temperature in H$_2$. At room temperature, the catalyst was passivated in 1% O$_2$ in N$_2$ for several hours. FIG. 2A shows a low magnification scanning electron microscopy (SEM) image of K—Mo$_2$C/γ-Al$_2$O$_3$, and FIG. 2B shows a high magnification SEM image of K—Mo$_2$C/γ-Al$_2$O$_3$.

Figure 3:
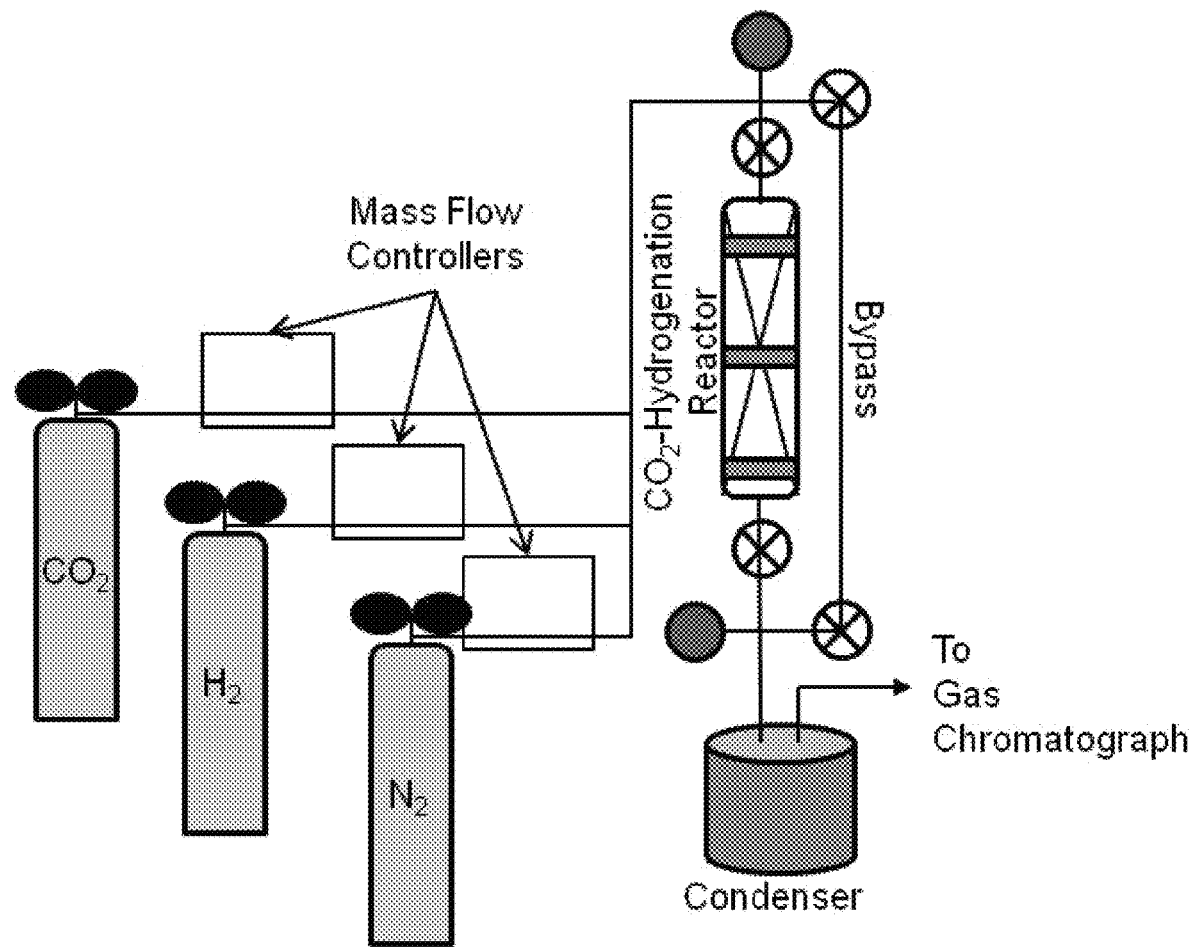
FIG. 3 is a schematic of a reactor set-up for CO$_2$ hydrogenation.

CO$_2$ hydrogenation via the RWGS reaction is performed while flowing carbon dioxide, hydrogen gas, or any combination thereof over the A-Mo$_2$C/γ-Al$_2$O$_3$ catalyst material. FIG. 3 shows a schematic of a reactor set-up for CO$_2$ hydrogenation. In the CO$_2$ hydrogenation experiment, 500 mg of A-Mo$_2$C/γ-Al$_2$O$_3$ was loaded into a ¼ in stainless steel reactor and reduced under 50 sccm H$_2$ at 50 psig for 2.5 h at 300° C. After reduction, the reactor was isolated and the bypass pressurized to 290 psig with 6.3 sccm CO$_2$, 18.9 sccm H$_2$ and 5.0 sccm N$_2$, for a H$_2$:CO$_2$ ratio of 3:1. At 290 psig, concentration of the reactants in the bypass was recorded as a baseline and gases were flowed into the reactor. Reactions were run for 22 h at 300° C. and concentrations of reactants and products were measured by an inline gas chromatograph.

Figure 4A:
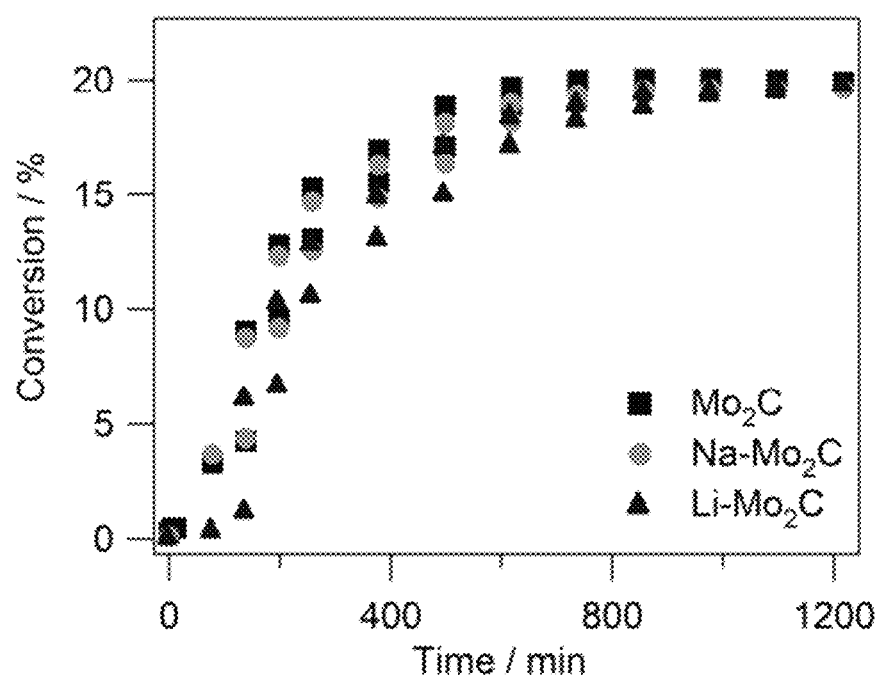
FIG. 4A is a plot of CO$_2$ conversion versus time for the Mo$_2$C and A-Mo$_2$C (A=K, Na, Li) supported on γ-Al$_2$O$_3$.
Figure 4B:
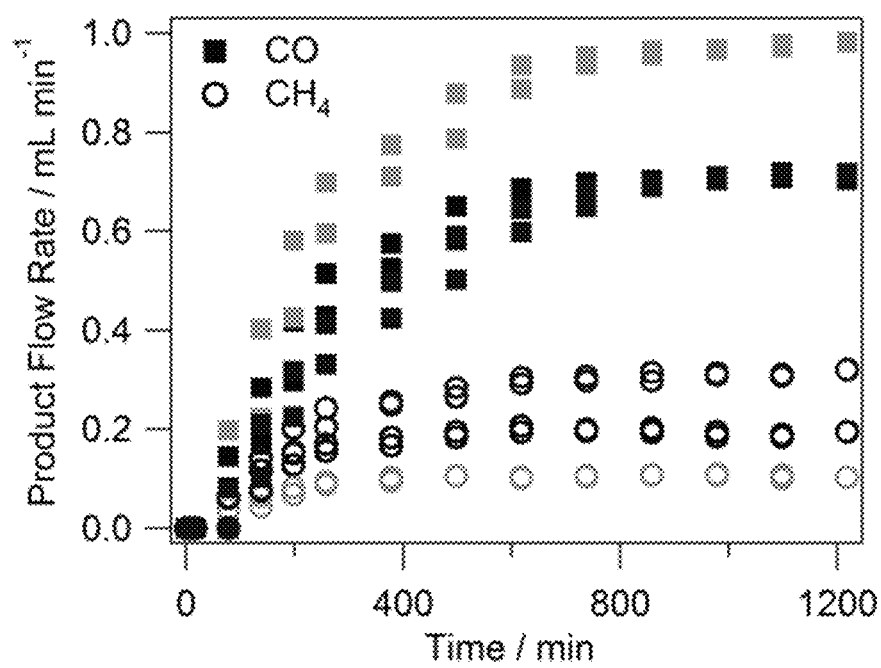
FIG. 4B is a plot of production of CO and CH$_4$ versus time for Na—Mo$_2$C/γ-Al$_2$O$_3$, Li—Mo$_2$C/γ-Al$_2$O$_3$ and Mo$_2$C/γ-Al$_2$O$_3$.

Table 1 shows a summary of performance of Mo$_2$C and A-Mo$_2$C (A=K, Na, Li) supported on γ-Al$_2$O$_3$ for CO$_2$ hydrogenation. FIG. 4A shows a plot of CO$_2$ conversion versus time for the Mo$_2$C and A-Mo$_2$C (A=K, Na, Li) supported on γ-Al$_2$O$_3$, and FIG. 4B shows a plot of production of CO and CH$_4$ versus time for Na—Mo$_2$C/γ-Al$_2$O$_3$, Li—Mo$_2$C/γ-Al$_2$O$_3$ and Mo$_2$C/γ-Al$_2$O$_3$. The CO$_2$ hydrogenation via the RWGS reaction can achieve a CO yield of 12% or greater and a CO selectivity of 90% or greater.

TABLE 1

| Catalyst | Conversion/% | CO Selectivity/% | CO Yield/% |
|---|---|---|---|
| $Mo_2C/\gamma\text{-}Al_2O_3$ | 19.9 | 73.5 | 14.6 |
| $K\text{—}Mo_2C/\gamma\text{-}Al_2O_3$ | 17.2 | 95.9 | 16.5 |
| $Na\text{—}Mo_2C/\gamma\text{-}Al_2O_3$ | 19.6 | 86.3 | 16.9 |
| $Li\text{—}Mo_2C/\gamma\text{-}Al_2O_3$ | 19.8 | 62.1 | 12.3 |

The increased CO yield from doping a $Mo_2C/\gamma\text{-}Al_2O_3$ catalyst with alkali metals offers an improved route for CO production from $CO_2$. The best currently available catalysts can only achieve a CO yield and selectivity of 14.6% and 75% at 300° C., respectively, while $K\text{—}Mo_2C/\gamma\text{-}Al_2O_3$ reaches a CO yield and selectivity of 16.5% and 96%, respectively. Selectively producing CO from $CO_2$ enables a facile route to synthesize synthetic hydrocarbons from $CO_2$ through down-stream Fischer-Tropsch.

$Na\text{—}Mo_2C/\gamma\text{-}Al_2O_3$ reaches a similar CO yield to $K\text{—}Mo_2C/\gamma\text{-}Al_2O_3$, while $Li\text{—}Mo_2C/\gamma\text{-}Al_2O_3$ shows a lower selectivity to CO than $Mo_2C/\gamma\text{-}Al_2O_3$. Maintaining the same A:Mo weight ratio in $Li\text{—}Mo_2C/\gamma\text{-}Al_2O_3$ results in a significantly lower weight fraction of Li because of the lower atomic weight of Li relative to Na and K. It is possible this lower amount of dopant results in the lower CO selectivity for $Li\text{—}Mo_2C/\gamma\text{-}Al_2O_3$. The Li:Mo and Na:Mo ratios can be further optimized.

The addition of K to catalysts as a promoter has not yet been recorded with a $Mo_2C$-based catalyst for $CO_2$ hydrogenation. Furthermore, doping $Mo_2C$-based catalysts with Li and Na has not been attempted in literature for $CO_2$ hydrogenation. By doping $Mo_2C/\gamma\text{-}Al_2O_3$ with alkali metals, CO selectivity substantially increases for K and Na, which is likely caused by attenuation of the electronic properties of the $Mo_2C$ phase. These electronic effects are only present when $Mo_2C$ is doped with a small amount of alkali metal, thereby attenuating the CO binding energy and preventing further hydrogenation into $CH_4$ or other hydrocarbons.

$A\text{-}Mo_2C/\gamma\text{-}Al_2O_3$ (A=K, Na, Li) was also tested at other temperatures (250-1000° C.), other alkali metal loadings (0.1-15%), other Mo loadings (1-70%), carburization temperatures (400-1000° C.) on other supports ($SiO_2$, $TiO_2$, $ZrO_2$), gas compositions ($CO_2$:$H_2$=1:1, 1:2, 1:3) and pressures (0-350 psig). Higher temperature improves conversion for $K\text{—}Mo_2C/\gamma\text{-}Al_2O_3$ to 28.6%, without the expense of CO selectivity (94.8%). Increasing K loading to 5% increases CO selectivity to 99.4% at the expense of conversion (3.8%). Higher Mo loading lowers conversion to 6.6% and raises selectivity slightly to 97.8%.

The exact optimal metal loading and A:Mo (A=K, Na, Li) ratio on the $\gamma\text{-}Al_2O_3$ support can be further optimized based on this finding of such high CO selectivity, especially over $Na\text{—}Mo_2C/\gamma\text{-}Al_2O_3$ and $K\text{—}Mo_2C/\gamma\text{-}Al_2O_3$.

Example

In this example, kinetic experiments and characterization tools were combined with DFT calculations to probe the catalytic properties of K-promoted $Mo_2C$ and understand the reaction mechanisms of $CO_2$ dissociation. Flow reactor results indicate that $K\text{—}Mo_2C/\gamma\text{-}Al_2O_3$ is a highly active and stable RWGS catalyst exhibiting high selectivity towards CO over a range of operating conditions, with the presence of K promoting $CO_2$ dissociation to CO. These findings are supported by X-ray diffraction (XRD), scanning electron microscopy (SEM) with energy dispersive X-ray spectroscopy (EDS), X-ray photoelectron spectroscopy (XPS) measurements and DFT calculations.

To experimentally determine the effect of K addition on $Mo_2C$-based supported catalysts, $K\text{—}Mo_2C/\gamma\text{-}Al_2O_3$ and the corresponding $Mo_2C$, Mo and K—Mo control catalysts, all supported on $\gamma\text{-}Al_2O_3$, were synthesized through an evaporation-deposition procedure. XRD measurements over the reduced catalysts indicate that each of the synthesized catalysts contain a combination of $MoO_2$, $\beta\text{-}Mo_2C$ and metallic Mo. Each of these phases was assigned to the synthesized catalysts by comparing the XRD spectra with the standard database for specific bulk Mo phases. XRD measurements of the Mo-based catalysts indicated that $Mo_2C/\gamma\text{-}Al_2O_3$ and 2 wt % $K\text{—}Mo_2C/\gamma\text{-}Al_2O_3$ contained a mixture of $\beta\text{-}Mo_2C$ and $MoO_2$ supported on $\gamma\text{-}Al_2O_3$. All supported Mo-based catalysts exhibited large peaks at 45.8° and 66.6°, from the $\gamma\text{-}Al_2O_3$ support, and no identifiable peaks for $MoO_3$ were present in any of the samples. Closer inspection of the XRD spectra revealed the presence of a phase assigned to metallic Mo at 40.5°, 58.7° and 73.7° on the $K\text{—}Mo_2C/\gamma\text{-}Al_2O_3$ and $K\text{—}Mo/\gamma\text{-}Al_2O_3$ catalysts. These peaks were not present in $Mo_2C/\gamma\text{-}Al_2O_3$, suggesting that the addition of K promotes the formation of a metallic Mo phase.

SEM images with EDS mapping of the reduced catalysts were used to better identify the structure of $K\text{—}Mo_2C/\gamma\text{-}Al_2O_3$. Overall, the morphology and particle size of the catalysts appeared to be similar, with the SEM image of $Mo_2C/\gamma\text{-}Al_2O_3$ found in the SI. The EDS maps, however, showed that the distribution of Mo over each catalyst was notably different. The EDS map of the $Mo_2C/\gamma\text{-}Al_2O_3$ catalyst, found in the SI, indicated that molybdenum was evenly distributed over the $\gamma\text{-}Al_2O_3$ support. On $K\text{—}Mo_2C/\gamma\text{-}Al_2O_3$, there was both (1) a large degree of segregation between Mo and Al-rich areas and (2) K being preferentially found in the Mo-rich areas, which suggests K directly affects the electronic properties of the active $Mo_2C$ phase.

Regardless of the differences in catalyst particle size and morphology, there was no significant difference in catalytic activity between the two samples. The conversion of $Mo_2C/\gamma\text{-}Al_2O_3$ and $K\text{—}Mo_2C/\gamma\text{-}Al_2O_3$ was similar. Although the activity of the two catalysts was comparable, the addition of 2 wt % K to $Mo_2C/\gamma\text{-}Al_2O_3$ significantly improved the selectivity towards CO. There was a strong promotional effect from the addition of K, which led to high CO selectivity (~95%) from 6 to 23% conversion, the thermodynamic maximum for RWGS at 300° C. with a 3:1 $H_2$:$CO_2$ mixture. Furthermore, the addition of the K promoter decreased the deactivation percentage from 11.7% to 7.3% after 68 h on stream, an improvement in catalytic stability.

The K loading was varied from 1-3 wt % to determine the effect of K on catalytic performance. The 1 wt % $K\text{—}Mo_2C/\gamma\text{-}Al_2O_3$ had a slightly higher CO yield than 2 wt % $K\text{—}Mo_2C/\gamma\text{-}Al_2O_3$, but with increased methane production, which wastes valuable $H_2$ and requires a separation step before FT. Furthermore, as K loading increased, there was a drop in catalytic activity, likely from the blocking of active sites. This relationship between K loading and CO yield was not linearly dependent on temperature. At the higher temperature, the 3 wt % $K\text{—}Mo_2C/\gamma\text{-}Al_2O_3$ achieved 40.5% conversion and 98.2% CO selectivity, which outperformed the 2 wt % $K\text{—}Mo_2C/\gamma\text{-}Al_2O_3$ and industrial $ZnO/Al_2O_3$ and $ZnO/Cr_2O_3$ catalysts. (Joo et al., Ind. Eng. Chem. Res., 38, 1808-1812 (1999)).

Uncarburized $Mo/\gamma\text{-}Al_2O_3$ and 2 wt % $K\text{—}Mo/\gamma\text{-}Al_2O_3$ catalysts were tested to clarify the role of metallic Mo identified in $K\text{—}Mo_2C/\gamma\text{-}Al_2O_3$ in the XRD measurements. The $Mo/\gamma\text{-}Al_2O_3$ and $K\text{—}Mo/\gamma\text{-}Al_2O_3$ control catalysts were reduced ex situ in pure $H_2$ at 600° C. prior to reaction to form metallic Mo. The pre-reduction step ensured the high activity and CO selectivity of the $Mo_2C$-based catalysts originated from the Mo carbide phase, and not metallic Mo. The Mo carbides, synthesized with $CH_4$, were more active than the corresponding uncarburized catalysts, indicating that the carburization step was necessary for high catalytic activity and that the metallic Mo phase in $K-Mo_2C/\gamma-Al_2O_3$ was not solely responsible for the high performance.

By modifying $Mo_2C/\gamma-Al_2O_3$ with a K promoter, the CO selectivity and yield increased significantly, and approached the maximum thermodynamic yield for RWGS, under the appropriate reaction conditions. Addition of K also improved the catalyst stability, with only 7.3% deactivation after 68 h on stream. Catalyst characterization by SEM with EDS clearly showed that K is preferably found in Mo-rich regions, while Mo is more evenly distributed in $Mo_2C/\gamma-Al_2O_3$. Furthermore, $K-Mo_2C/\gamma-Al_2O_3$ maintained the Mo in a reduced and active state as evidenced by XPS measurements. These experimental results are supported by DFT calculations, which showed enhanced $CO_2$ adsorption and reduced $CO_2$ dissociation barriers on the K-promoted, compared to the pristine, Mo-terminated $\beta-Mo_2C(001)$ surfaces. Notably, the DFT calculations predicted a 2.8 kcal $mol^{-1}$ lower activation barrier for CO formation upon K addition, which is in excellent agreement with the experimentally measured difference of 2.6 kcal $mol^{-1}$. These findings show that $K-Mo_2C/\gamma-Al_2O_3$ is a highly selective catalyst for producing CO from $CO_2$ and has the potential to be used as a commercial RWGS catalyst.

The above descriptions are those of the preferred embodiments of the invention. Various modifications and variations are possible in light of the above teachings without departing from the spirit and broader aspects of the invention. It is therefore to be understood that the claimed invention may be practiced otherwise than as specifically described. Any references to claim elements in the singular, for example, using the articles "a," "an," "the," or "said," is not to be construed as limiting the element to the singular.

What is claimed as new and desired to be protected by Letters Patent of the United States is:

1. A supported heterogeneous catalyst material for catalyzing the reverse water-gas shift (RWGS) reaction for the selective formation of CO, comprising:
    a support material comprising $\gamma-Al_2O_3$; and
    an active material comprising alkali-metal doped molybdenum carbide, wherein the alkali-metal component of the active material comprises one or more alkali-metal precursors in elemental form or in the form of oxides, said metal being Na.

2. A supported heterogeneous catalyst material for catalyzing the reverse water-gas shift (RWGS) reaction for the selective formation of CO, comprising:
    a support material comprising $\gamma-Al_2O_3$; and
    an active material comprising alkali-metal doped molybdenum carbide, wherein the alkali-metal component of the active material comprises one or more alkali-metal precursors in elemental form or in the form of oxides, said metal being Li.

* * * * *